United States Patent
Mohr et al.

(10) Patent No.: US 8,160,297 B2
(45) Date of Patent: Apr. 17, 2012

(54) SYSTEM FOR PROCESSING AN IMAGE OF A SURROUNDING OF A VEHICLE

(75) Inventors: Ulrich Mohr, Karlsruhe (DE); Martin Stephan, Etteingen (DE); Andreas Stiegler, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1168 days.

(21) Appl. No.: 11/950,350

(22) Filed: Dec. 4, 2007

(65) Prior Publication Data
US 2008/0211643 A1 Sep. 4, 2008

(30) Foreign Application Priority Data
Dec. 4, 2006 (EP) .................................. 06025032

(51) Int. Cl.
*G06K 9/00* (2006.01)
(52) U.S. Cl. ......................................... 382/103; 701/200
(58) Field of Classification Search .................. 382/100, 382/103, 106, 107; 701/23, 27, 28, 200
See application file for complete search history.

(56) References Cited

U.S. PATENT DOCUMENTS

| | | | | |
|---|---|---|---|---|
| 4,896,210 | A | * | 1/1990 | Brokenshire et al. ........... 348/51 |
| 5,087,969 | A | * | 2/1992 | Kamada et al. ............... 348/119 |
| 5,615,046 | A | * | 3/1997 | Gilchrist ....................... 359/464 |
| 6,327,522 | B1 | * | 12/2001 | Kojima et al. ..................... 701/1 |
| 7,221,777 | B2 | * | 5/2007 | Nagaoka et al. .............. 382/104 |
| 2002/0159616 | A1 | * | 10/2002 | Ohta .............................. 382/104 |
| 2004/0032971 | A1 | * | 2/2004 | Nagaoka et al. .............. 382/103 |

FOREIGN PATENT DOCUMENTS

| EP | 1562147 A1 | 8/2005 |
|---|---|---|
| EP | 1637837 A1 | 3/2006 |
| GB | 2265779 A | 3/1993 |

* cited by examiner

*Primary Examiner* — Anand Bhatnagar
(74) *Attorney, Agent, or Firm* — The Eclipse Group LLP

(57) ABSTRACT

A system for processing an image of a surrounding of a vehicle is provided. The system includes an image generator that is configured for generating an image, the image having at least a first and a second portion. The first and second portions of the image differ from each other and the first portion of the image is generated for further processing earlier than the second portion of the image. Additionally, the system includes an image processor for processing the first and second portions of the image, where the image processor is configured for processing the first portion of said image while awaiting for the second portion of the image to become available to the image processor.

25 Claims, 6 Drawing Sheets

SYSTEM FOR PROCESSING AN IMAGE OF A SURROUNDING OF A VEHICLE

RELATED APPLICATIONS

This application claims priority of European Patent Application Serial Number 06 025 032.1, filed on Dec. 4, 2006, titled APPARATUS AND METHOD FOR PROCESSING AN IMAGE OF A SURROUNDING OF A VEHICLE, which application is incorporated in its entirety by reference in this application.

BACKGROUND

1. Field of the Invention

This invention relates to an image processing system. In particular, this invention relates to an apparatus and a method for processing and displaying an image of the surrounding of a vehicle to a driver.

2. Related Art

Modern vehicles provide sophisticated functionalities to its drivers. Recently, the development of systems is being discussed in which a driver is provided with an image of the surrounding of the vehicle on a small display in the cockpit of the vehicle. This is, for example, especially helpful in the case when the position of the driver in the vehicle does not allow the driver to visually gather all relevant information. Driving into a parking spot could be such a situation in which positioning a camera at the backside of the vehicle may be beneficial. For example, providing an image of the vehicle surroundings from a camera to a display in the cockpit could strongly assist the driver in quickly reaching a parking position. Another example could be capturing an image of a road before the vehicle when sight is obscured by fog or supervising the rear part of the road for approaching vehicles. Before displaying such an image, the picture data can then be processed to improve recognition of objects in the fog. Displaying such picture at the display in the cockpit of the vehicle would then provide the advantage of earlier recognizing obstacles on the road such that, for example, an adaption of the speed of the vehicle can be performed in time. However, processing and/or displaying such a picture normally requires an analog-to-digital-conversion or even a direct digital capture of the image. Furthermore, a transfer and the display of such an image has a high latency since conventional systems work on a whole video image approach. This means that only complete video images are captured consecutively by a sensor and are processed or transferred as a complete image.

Such a conventional approach of processing whole images can be seen in FIG. 1. FIG. 1 is a schematic scheme illustrating a conventional image processing approach for processing different images at different processing or generation stages. At the ordinate of FIG. 1, different pipeline stages, for example, the image generation (stage 1), an image transfer (stage 2), image processing (stage 3), image display (stage n), etc. are depicted. At the abscissa of FIG. 1, a time duration is depicted. As can be seen from FIG. 1, the first image (Image 1) is generated at stage 1, which can be concluded from the Image 1 being located at a first position 100. However, generating Image 1 in the first position 100 takes a time $t_p$ which can be concluded from the abscissa of FIG. 1. Subsequently, Image 1 is transferred to stage 2, which then processes Image 1 at a later time instant (see position 202 in FIG. 1). Stage 1 generates a new image, now denoted as Image 2 (see position 204 in FIG. 1). When stage 2 has completed processing Image 1, Image 1 is transferred to stage 3 and Image 2 his transferred from stage 1 to stage 2. Furthermore, a new image, namely Image 3, is generated in stage 1. In this case, the processing (i.e., respectively generating) of an image includes several stages and the latency in which the image is processed completely can be calculated by the formula $t_{total}=t_p*n$. This total latency $t_{total}$ is depicted on the abscissa of FIG. 1.

More precisely, given a capture frequency f, it takes a time of 1/f to get a complete image. Even if the steps of processing or displaying can be performed much faster, it is not possible to increase the image rate as the sensor only provides images in an image rate of 1/f. Typical image rates of conventional sensors (i.e. cameras) provide images with an image rate f=25/s, which results in an image latency of 40 ms. When latency for displaying or processing is also considered, the latency of conventional systems easily rises above 80 ms. In contrast, it has to be mentioned that the human visual system has a much lower latency such that displaying an image on a display in the cockpit with a latency above 80 ms will result in an irritation of the driver of the vehicle. This, in turn, reduces the safety of the vehicle as the driver's attention is drawn off the traffic situation.

Therefore, a need exists for providing an improved way for processing an image in a vehicle, in particular, an improved system for processing an image of the surrounding of a vehicle.

SUMMARY

A system for processing an image of a surrounding of a vehicle is provided. The system includes: (i) an image generator being configured for generating an image, the image having at least a first and a second portion, the first and second portions being different from each other and the first portion of the image being provided for further processing earlier than the second portion of the image; and (ii) an image processor being configured for processing the first and second portions of the image in order to process the image, where the image processor is furthermore configured for processing said first portion of said image while said second portion of said image is not yet available to the image processor.

In one implementation of the invention, the image generator may be configured for generating a horizontal slice of the image as the first or second portion of the image. As the human eye is accustomed to capturing information in horizontal lines, generating a horizontal portion of the image enables the driver to get the relevant information from the display quickly. Additionally, conventional cameras capture images row-wise, such that a horizontal slicing of the image can be easily realized by low-cost image capture systems as no difficult shaping of the portions of the image is needed in the image generator.

According to a further implementation, the image generator can be configured for generating n portions of the image being different from each other, n being a natural number and the n portions of the image being generated consecutively after each other and where the image processor is configured for processing the n-th portion of the image after processing the (n−1)-th portion of the image. By utilizing such a configuration, the image generator can split-off the image into subsequent portions such that a fast processing of the complete image can be performed portion-wise. In contrast to only processing the first and second portion, splitting-off the complete image in a plurality of portions additionally increases processing speed as the time needed for processing the complete image is proportional to the number of portions into which the image is split.

A method for processing an image of a surrounding of a vehicle is also provided. The method including the steps of (i)

generating an image having at least a first and a second portion, the first and second portions being different from each other and the first portion of the image being provided earlier than the second portion of the image; and (ii) processing the first and second portions of the image in order to process the image, where the image processor is furthermore configured for processing said first portion of said image while said second portion of said image is not yet available to the image processor.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 2:
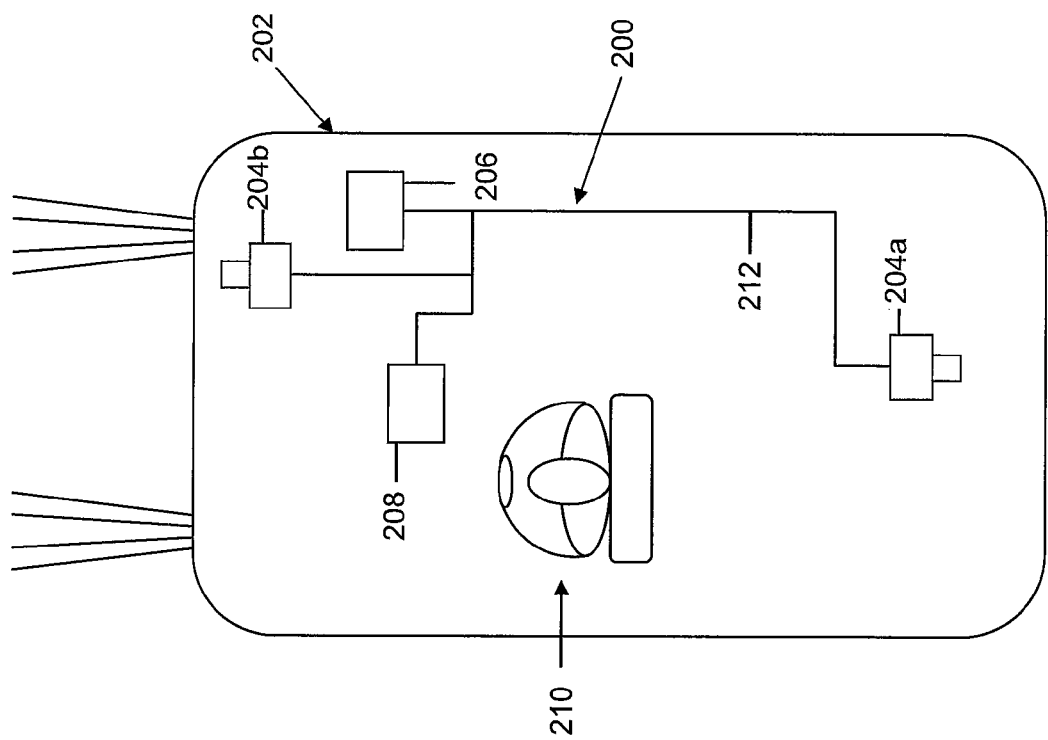
FIG. 2 is a schematic block diagram of an apparatus utilizing the system of the invention for processing an image of the surrounding of a vehicle.

FIG. 2 is a schematic diagram illustrating an apparatus 200 utilizing the system of the invention for processing an image of the surrounding of a vehicle. As can be seen in FIG. 2, the system may be implemented in a vehicle 202, for example, a car. The apparatus 200 includes at least one image generator 204. As illustrated, in the disclosed implementation, two image generators 204a and 204b may be utilized. In this example, a rear view camera 204a and a front view camera 204b are illustrated. Nevertheless, it is also possible to utilize only one image generator 204, for example, only the rear view camera 204a.

Additionally, the apparatus 200, as illustrated in FIG. 2, may include an image processor 206, as well as a display 208, that is adapted to display the image to the driver 210 of the vehicle 202. The elements of the apparatus 200, namely the rear view camera of 204a, the front view camera 204b, the image processor 206 and the display 208 may be connected to each other by a bus 212, which can be implemented, for example, as an optical fiber for transmitting serially coded data. Furthermore, the driver 210 of the vehicle 202 may be able to turn a switch at the display 208 to make sure that either the image generated by the rear view camera 204a or the image generated by the front view camera 204b is displayed at the display 208.

The functionality of the apparatus 200, in accordance with one example of an implementation, may be described as follows. When the rear view camera 204a generates an image, this image is not transferred as a whole image via the bus 212 to the image processor 206. Rather, the generated image is separated into horizontal slices of the image. Utilizing this approach, the image sensor must function to capture the image not as a whole, but segment-wise like, for example, row-wise.

Figure 3:
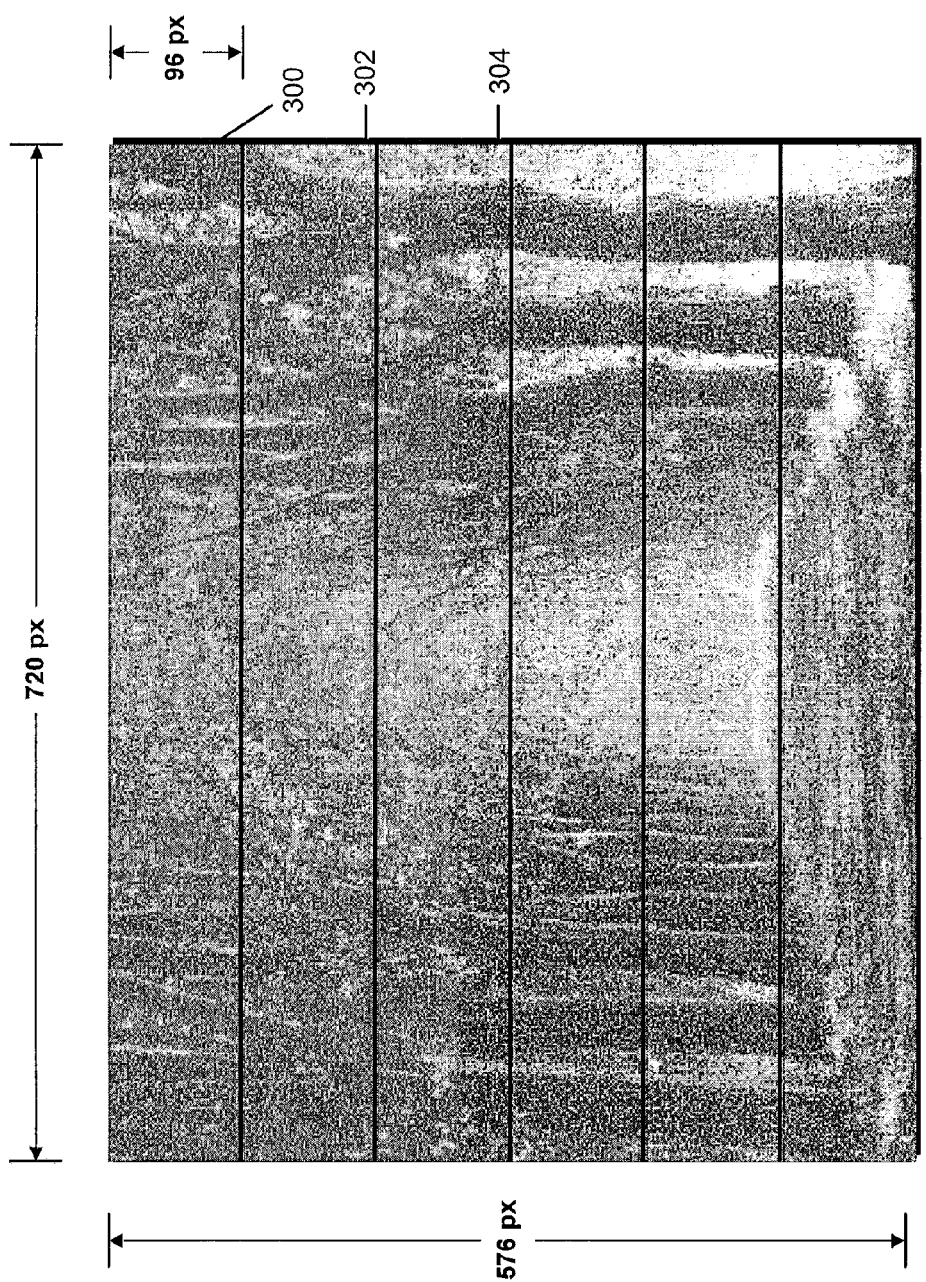
FIG. 3 is an example of an image generated by the image generator where the image is composed of several image portions.

FIG. 3 shows an example of an image generated by the image generator 206 where the image is composed of several image portions. In the illustrated example, the image has a height of 576 pixels and a width of 720 pixels. When capturing this picture, the rear view camera 204a may segment this picture into 6 slices, each having a height of 96 pixels. Those skilled in the art will recognize that the horizontal slicing of the image is shown only for explanation purposes and the invention should not be limited to a horizontal slicing of the image, other image slicing techniques may be utilized and are intended to be within the scope of the invention.

In operations, after the data of the first (upper) image slice 300 is completely captured, the data of the first image slice 300 is send via the bus 212 to the image processor 206. The image processor 206 can then start processing the first image slice 300 while the image generator 204, such as the rear view camera 204a, can capture the data of the second slice 302 of the image. After the date of the second slice 302 of the image has been captured by the rear view camera 204a, the data of the second slice 302 may then be transferred via the bus 212 to the image processor 206. The image processor 206 may then already have completed the processing of the first slice 300 of the image such that the first slice 300 of the image can be sent to the display 208 via the bus 212. Subsequently, the image processor 206 can further process the data of the second slice 302 of the image while the rear view camera 204a captures the data of the third slice 304 of the image. Such processing can be repeated until the image is completed, respectively, by generating and processing all slices of the image by the image processor 206.

Figure 4:
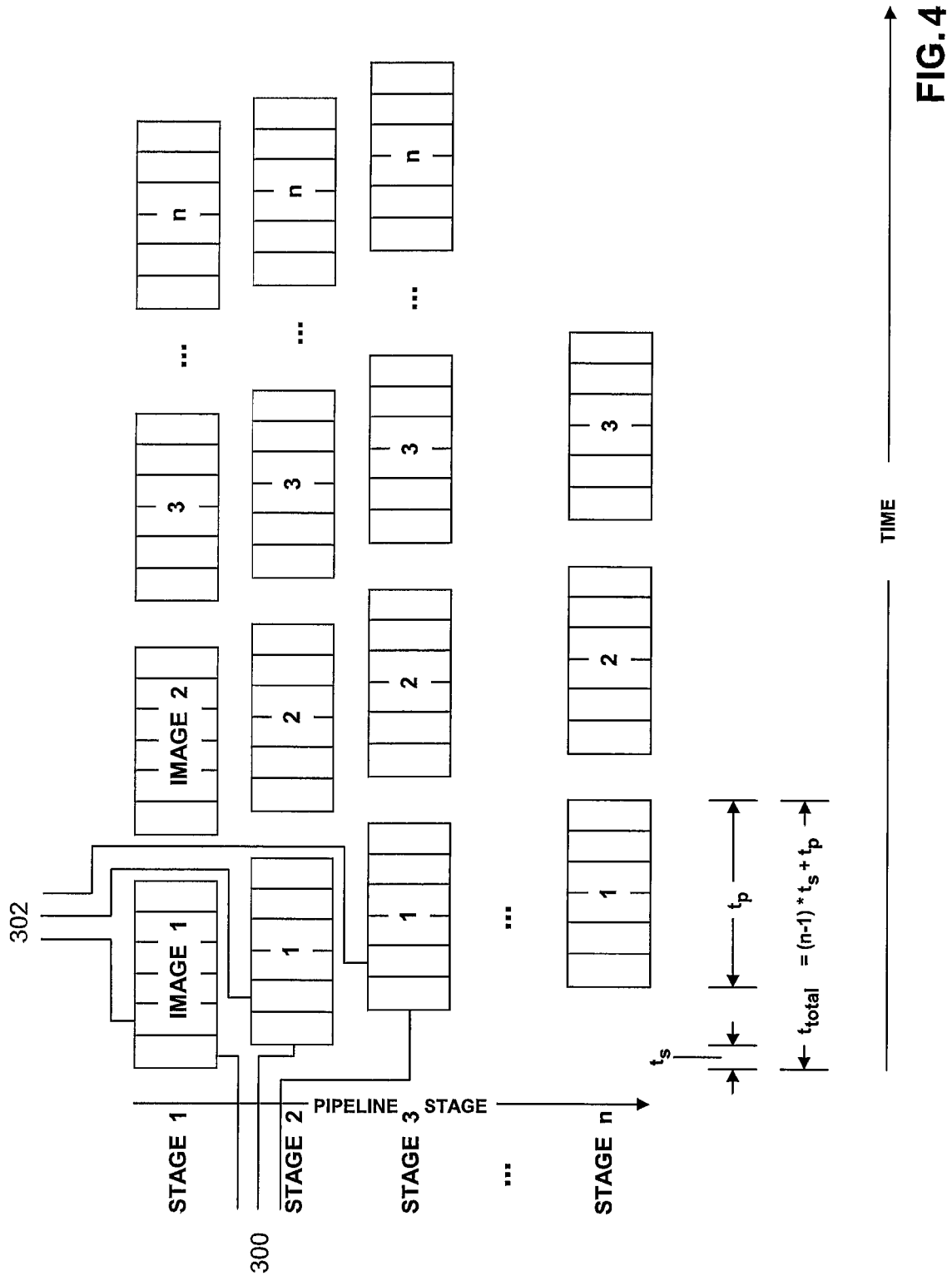
FIG. 4 is a schematic scheme illustrating the processing of different portions of an image by generation stages.

FIG. 4 shows a schematic scheme of one example of processing of different portions of an image. The diagram in FIG. 4 is similar in format to the diagram of FIG. 1. In contrast to the diagram of FIG. 1, it can be clearly recognized from FIG. 4 that the total latency $t_{total}$ of the system of the invention is much lower than the total latency $t_{total}$ of conventional approaches. This is due to the parallelized processing structure where as the first slice 300 of Image 1 can already be processed in stage 2, while the second slice 302 of Image 1 is still being generated in stage 1, which optimizes performance when a high number of image slices is utilized.

In the illustrated example, the total latency $t_{total}$ according to the illustrated approach can be calculated according to the formula $t_{total}=(n-1)*t_s+t_p$ with $t_s$ being the time for capturing (respectively processing) an image slice and $t_p$ being a time for processing a whole image. On a minor note only, it has to be mentioned that the present considerations are based on the assumption that a time for capturing the image slice is nearly equal to the time of processing this image slice. However, this assumption is not a prerequisite for implementing the invention and is only utilized for explanation purposes. Thus, it can be seen that latency can be improved and be expressed by the factor $(n-1)*t_s$ such that it is desirable to have a high number of slices in an image. Nevertheless, it is desirable to have no more than six to eight slices of an image, otherwise the signaling overhead for recognizing each of these slices would become very large, which would, in turn, decrease the processing speed.

Figure 5:
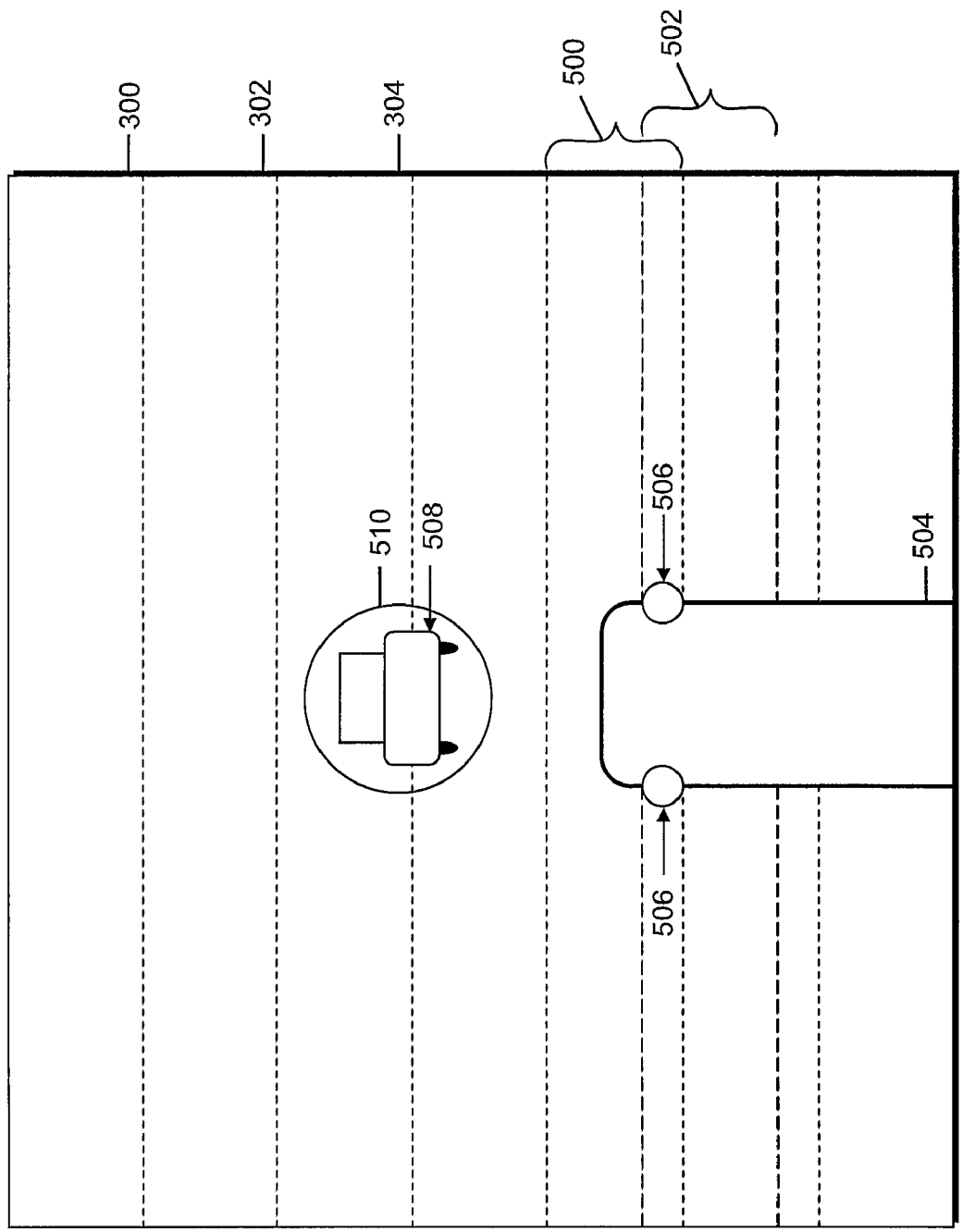
FIG. 5 shows a schematic diagram of an image generated by the image generator, the image having overlapping and non-overlapping portions and where object detection can be performed based on the generated image portions.

The segmentation into slices 300, 302 and 304 can be seen more clearly in FIG. 5. The slices can either be chosen such a that they do not cover common areas of the image, i.e. they have no overlapping sections like the slices 300, 302 and 304 or, such that they have overlapping sections like the slices 500 and 402. The choice of non-overlapping slices allows the picture to be captured or processed faster, as no data is processed twice. On the other hand, it is much easier for a processor to process image data, for example, extract object information, from the image data of the slices, when the processor can use the silhouette of the objects at a border region of the slice to adjust the slices to each other for the detection. In this way, the image processor can much easier detect large objects that extend across more than one slice.

For demonstration purposes, an object, for example, a pole 504, is shown in FIG. 5. In the case the slices of the image overlap, there exist image areas 506 that can be used to adjust the position of a the slices such a that the pole 504 can be actually detected in whole and not only be interpreted as object within one slice. Moreover, it may not be necessary that the image is uniquely segmented either in non-overlapping slices or in overlapping slices. Rather, the invention may also be implemented according to a further implementation in which overlapping and non-overlapping slices are utilized. Especially, in a middle section of the image, it may be helpful to use overlapping slices as the middle section is normally the most important section of a picture such a that a high degree of detection accuracy may be desirable to provide for the section that can be realized with overlapping slices. As other sections of an image normally do not include as much relevant information as the middle section of the image, it is normally not necessary to implement, for these sections, a structure using overlapping slices that would require a higher data processing effort as if non-overlapping slices were utilized.

Additionally, more complex objects can also be detected across the slice borders, like the car 508, even in the case where the slices do not overlap. However, it may be more complicated to detect such objects as the image processor does not get any information whether the object ends at a slice border and a new, different object is positioned at the opposite slice such that the slice border is not only a virtual imaginary border, but also, a physical border of two separate objects. An object detection can then be only performed if the silhouette of the complete object via two or more slices can be recognized, for example by a matching of the detected silhouette with a known silhouette stored in the memory. As an additional feature, according to one implementation, it is shown in FIG. 5 that the image processor 206 can draw into the slices additional objects 510 like rectangles, circles or triangles around detected objects that are recognized to be of importance for the safety of the vehicle. The additional objects can, for example, be drawn in different colors as to attract the attention of the driver of the vehicle. In the embodiment shown in FIG. 5, a car 508 being in front of the vehicle 202 is detected such that, for example, the distance to the car 508 can be computed by the image processor as another feature. For such processing, it might be helpful to detect the type of the car 508 from the silhouette and provide information about the actual dimensions of the detected car 508 from memory. Subsequently, the distance between the vehicle 202 and car 508 in front of the vehicle can be computed on the basis of a the dimensions of the recognized type of car 508. In this manner, in the described implementation, the system can also be utilized, for example, as a distance warner when the vehicle 202 is in motion. Also, in this scenario, the system has a very low latency such that a warning can be provided to the driver early enough before a possibly dangerous situation arises.

Figure 6:
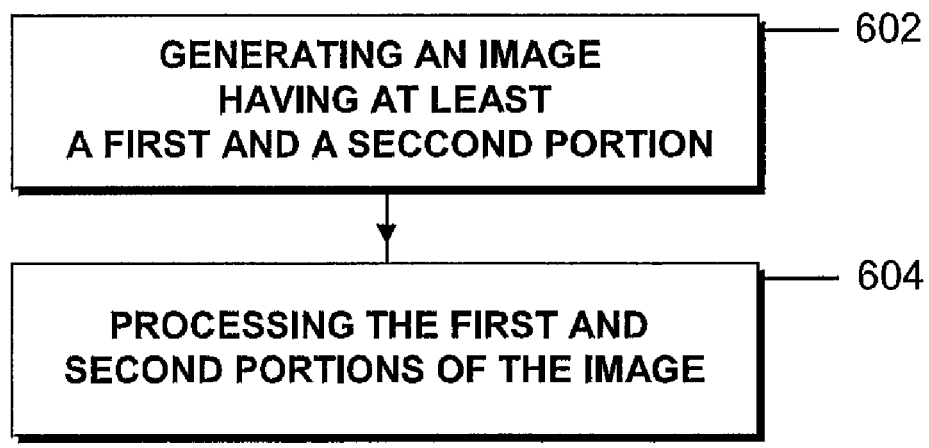
FIG. 6 shows a flowchart representing a method for processing an image of the surrounding of a vehicle.

FIG. 6 shows a flowchart representing a method for processing an image of the surrounding of a vehicle according to an embodiment of the invention. Such a method includes, as a first step 602, generating an image that has at least a first and a second portion. These portions can be, for example, non-overlapping slices 300, 302, 304 or the overlapping slices 500 or 502. In a subsequent step 604, processing of the first and second portions of the image is performed such that the image can be displayed with a low latency or objects can be detected from the image and data of the different slices. The step of generating 602 or the step of processing 604 can be implemented as mentioned above.

Summarizing the invention it has to mentioned that even if the individual processing step works significantly faster than in real-time (the processing takes $\ll 1/f$), there is no way to decrease the latency to less than $1/f$ when using a complete picture approach. The invention describes, according to one implementation, how the processing of latency can be reduced by working on n sup-images (portions) so that it is only limited by the speed of the actual processing and not by the time needed until a whole image is available. If the image is split into n sub-images, this results in a latency reduction up to factor n. Thus, the complete video processing pipeline is not working on a complete picture, but on a subset of the image, e.g., the image is divided into a set of scatters containing for example several lines of the image only. The division of the image depends on the capturing system: the image should be divided in such a way that the scatter is available earlier than the whole picture. In the example described above, the capture system may capture the video image from the top to the bottom, therefore, the first lines of the image are available significantly earlier than the lower lines.

As soon as the first scatter is available, the processing can be started without the need to wait for the rest of the image. This enables the second stage of the video pipeline to start even though the first stage (e.g. capture process) is not yet complete.

Those skilled in the art will recognize that the image generator can be a camera or the like and the image processor can be, for example, a microcontroller and/or a display unit. Therefore, the term "image processor" is not only limited to microcomputers or microcontrollers but also includes all kinds of displays as displaying is also a form of a processing received data. Further, the image generator may be, for example, a CMOS image sensor. The image processor may be, for example, a LCD display for displaying the first and second portion of the image.

The invention is based on finding that the latency from generating and processing an image can be significantly reduced when not a complete image is firstly generated (respectively captured) and afterwards the data of this complete image is processed but rather than a generation of the image is divided such that only parts of the image are generated and are then transferred to the image processor. The image processor is then able to process the firstly received part (portion) of the image while the image generator is still working in taking a further, different part of the image. Subsequently, the image generator transfers the further, different part of the image to the image processor, which then may probably has already completed the processing of the first part of the image and has transferred, for example, the processed version of the first part of the image to a further processing stage. Thus, it is possible to process the image by parts and not as a complete image such that (assuming the processing time for each part of the image being lower than a generation for said part of the image) a significant decrease of latency can be realized. This reduction in latency is the larger the more processing stages are utilized.

In one example of an implementation, the image processor is configured for displaying the first and second portions and the image processor being further configured for displaying the first portion of the image while the second portion of the image is not yet provided to the image processor by the image generator. Such an implementation of the image processor allows the driver of the vehicle to recognize the image on the display timely such a that a high degree of irritation resulting from a high latency time between capturing and displaying the image can be avoided. Additionally, the driver's human visual system can adequately be addressed as the human recognition system is not able to anticipate the displayed information at once but rather select relevant information step by step from the displayed image. Therefore, it is not necessary to display the image as a whole; the display of portions of the image time-after-time is completely sufficient.

According to another implementation, the image generator is configured for generating a horizontal slice of the image as the first or second portion of the image. As the human eye is used to capture information in horizontal lines, generating a horizontal portion of the image enables the driver to get the relevant information from the display quickly. Additionally, conventional cameras capture images row-wise, such that a horizontal slicing of the image can be easily realized by low-cost image capture systems, as no difficult shaping of the portions of the image is needed in the image generator.

Furthermore, the image generator can be configured for providing slices of the image as first and second portions of the image, where the first portion of the image represents an area of the image being located in the image above an area represented by the second portion of the image. Such a top-down approach in generating the image from different subsequent portions provides for the processing (especially a displaying) of the different portions of the image to be performed in a continuous way without forcing the eyes of the driver to jump between different image areas on the display. Therefore such a top-down approach helps not to attract too much attention of the driver on the display but rather give him enough time to observe the traffic situation carefully.

The first and second portions can also represent adjacent areas of the image. In such a situation, the process of capturing respectively generating the individual portions of the image can be simplified as normally the image generator provides the data of the portions line-by-line such a that only the data of a first group of lines is provided as the first portion of the image, where the immediately following lines are grouped together as the second portion. Additionally, the image processing can be simplified, as for example, in the case of an object extending from the first portion into the second portion of the image, the detection of a this object can be performed much faster as if a third offset portion is provided to the image processor, which does not represent an area of the image being located adjacent to the area covered by the first portion.

In another implementation, the first and second portions cover a common area of the image. This allows the image processor to more easily detect objects that cross the border of the first and second portion. This is due to the fact that the object can be identified by an identical pattern in the overlapping region of the first and second portions as well as the respective patterns in the first and second portions that directly connect to the identical patterns in the overlapping region. Therefore, the image processor can clearly distinguish between, on the one hand, objects that do not extend into an adjacent portion and, on the other hand, objects that extend across the border between the first and second portion.

However, in an alternative implementation, the first and second portions do not comprise any common area of the image. In such a configuration, the image processor does not need to process image data twice which, consequently, results in reduced processing time.

In another implementation, the first and second portions of the image are substantially equal size. In such a case, the image processor can be optimized for the processing of equally sized data packages, similar to using an FFT instead of a discreet Fourier transform, which again may result in a reduced processing time due to the usage of specially adapted algorithms.

According to yet another implementation, the image generator can be configured for generating n portions of the image being different from each other, n being a natural number and the n portions of the image being generated consecutively after each other and where the image processor is configured for processing the n-th portion of the image after processing the (n−1)-th portion of the image. In such a configuration, the image generator can split-off the image into subsequent portions such that a fast processing of the complete image can be performed portion-wise. In contrast to only processing the first and second portion, splitting-off the complete image in a plurality of portions additionally increases processing speed as the time needed for processing the complete image is proportional to the number of portions of the image is split into.

Increased processing speed may further be realized if the image generator is configured for generating the image from not more than eight portions. This is based on the fact that if the image generator splits-off the image into more than eight portions the signaling overhead for identifying each of these portions increases. An increase in signaling overhead, in turn, requires transferring a larger amount of data as well as an increased effort for unpacking the image data from a frame structure, which results in a higher processing time respectively higher latency.

According to another implementation, the image processor is configured to extract object information from objects including in the first or second portion of the image. In this manner, different functions of the image processing may be combined, as for example, just displaying quickly the captured image portion-wise and also some safety-relevant functionality as, for example, identifying obstacles before the car, when the car is in motion. Thus, not only the surrounding of a vehicle is quickly displayed to the driver, but to also a timely information about a possibly dangerous traffic situation can be provided to said driver.

Additionally, in another implementation, the image processor can also be configured for utilizing the extracted object information to add further objects to the first or second portions of the image. In this regard, the driver's attention can be directed to the detected object, especially when the shapes of the added objects clearly distinguish from normal shapes that can be expected in the surrounding of a vehicle.

More precisely, the image processor can be configured for adding circles, triangles or rectangles as further objects around objects detected in the first or second portion of the image. By choosing rectangles, circles or triangles as added objects around the detected objects, the driver's attention can be especially drawn on these detected objects. This is due to the fact that such geometrical shapes are firstly very unusual in a normal image of a surrounding of a vehicle and secondly these geometrical shapes are quite similar to traffic signs to which a driver normally pays enough attention.

In a further implementation, the image processor can be configured for adding the further objects in a different color than the objects detected in the first or second portion of the image. This increases the perceptibility of the detected objects as the driver's attention is guided to the detected objects by the contrast in color between the added objects and the detected objects.

Additionally, the image processor may be configured for extracting object information included in the first and second portions of the image, where the first and second portions are adjacent portions of the image. In this regard, larger objects that extend across two portions can easily be detected. Thus, the aspect of quickly generating (respectively processing) an image portion-wise can be combined with a high capability of recognizing also large objects, even if the image is split-off in a larger number of portions for the sake of an increase of processing speed.

According to a further implementation, the image generator can be synchronized to the image processor in such a way that when the first portion of the image is generated by the image generator said first portion is processed by the image processor without delay. In this manner, the latency for processing the image of the surrounding of the vehicle can be further decreased. This is due to the fact that, if, for example, the image generator provides a top slice of the image and the display of an image processor is still busy with displaying the lowest slice of the previous image the generated top slice of the image has to be stored in the meantime. Such a storage results in an additional latency that can be avoided if the image generator is synchronized to the image processor in such a way that, if for example of the top slice of an image is generated it is immediately processed (or displayed) by the image processor (respectively the display).

Furthermore, the image generator can also be further synchronized to the image processor in such a way that when the second portion of the image is generated by the image generator said second portion is processed by the image processor without delay. In this manner, the synchronization assures that not only privileged portions are displayed immediately but also subsequent portions are analogously immediately displayed such that a complete synchronization between the image generator and the image processor is achieved.

The image processor can furthermore be configured for processing the first portion of the image such that a processed version of the first portion of the image is provided after a latency time of 20 to 40 ms after the image generator has provided the first portion of the image. In this manner, the latency does not become too large to be recognized by the human eye that would, in turn, require too much attention of the driver to observe the image construction in the display and compare it with the real image.

In a further implementation, the image generator can be configured for transforming the first and second portion of the image in a digital representation thereof and for transferring the digital representation of the first and second portion of the image to the image processor. In this manner, the digital version of the portions of the image are transferred that are more robust against impairments during the transmission. Additionally, the analog-to-digital-conversion can already be performed in the image generator that, in turn, releases the burden of the image processor and thus enables the image processor to more quickly perform its own originary tasks.

Furthermore, the image generator can also be configured for transferring the digital representation of the first and second portion of the image via an optical serial bus of the vehicle to the image processor. Such a means for data transfer between the image generator and the image processor is lightweight, cheap and has a height transmission capacity that is highly desirable for implementation in a mass product like a vehicle.

In another implementation, the image generator is a rear view camera for providing a rear view of the vehicle. Such a configuration of the image generator enables the driver to, for example, timely identify cars approaching with high-speed. Furthermore, such a rear view camera as an image generator can also assist the driver when he wants to park the vehicle in a narrow parking spot.

As described above, methods for processing an image of a surrounding of a vehicle may be utilized by the system. In one implementation, the method includes: (i) generating an image having at least a first and a second portion, the first and second portions being different from each other and the first portion of the image being provided earlier than the second portion of the image; and (ii) processing the first and second portions of the image in order to process the image, where the image processor is furthermore configured for processing said first portion of said image while said second portion of said image is not yet available to the image processor.

While the main field of application of the invention is imaging of surroundings of a vehicle. It is obvious that the invention can also be applied in different image processing areas of technology.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIG. 2. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" and/or "signal-bearing medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An apparatus for processing an image of a surrounding of a vehicle, the apparatus comprising:
   an image generator being configured for generating an image, the image having at least a first and a second portion, the first and second portions being different from each other and the first portion of the image being generated for further processing earlier than the second portion of the image; and
   an image processor being configured for processing the first and second portions of the image in order to process the image, where the image processor is furthermore configured for processing said first portion of said image while said second portion of said image is not yet available to the image processor.

2. The apparatus of claim 1, where the image processor is configured for displaying the first and second portions and where the image processor is further configured for displaying the first portion of the image while the second portion of the image is not yet provided to the image processor by the image generator.

3. The apparatus of claim 1, where the image generator is configured for generating a horizontal slice of the image as the first or second portion of the image.

4. The apparatus of claim 3, where the image generator generates slices of the image as first and second portions of the image, where the first portion of the image represents an area of the image being located in the image above an area represented by the second portion of the image.

5. The apparatus of claim 4, where the first and second portions represent adjacent areas of the image.

6. The apparatus of claim 4, where the first and second portions cover a common area of the image.

7. The apparatus of claim 4, where the first and second portions do not comprise any common area of the image.

8. The apparatus of claim 1, where the first and second portions of the image have a substantially equal size.

9. The apparatus of claim 1, where the image generator is configured for generating n portions of the image being different from each other, n being a natural number and the n portions of the image being generated consecutively after each other and where the image processor is configured for processing the n-th portion of the image after processing the (n−1)-th portion of the image.

10. The apparatus of claim 1, where the image generator is configured for generating for said image not more than eight portions.

11. The apparatus of claim 1, where the image processor is configured to extract object information from objects comprised in the first or second portion of the image.

12. The apparatus of claim 11, where the image processor is configured for using the extracted object information in order to add further objects to the first or second portions of the image.

13. The apparatus of claim 12, where the image processor is configured for adding circles, triangles or rectangles as further objects around objects detected in the first or second portion of the image.

14. The apparatus of claim 12, where the image processor is configured for adding the further objects in a different color than the objects detected in the first or second portion of the image.

15. The apparatus of claim 11, where the image processor is configured for extracting object information comprised in the first and second portions of the image, where the first and second portions are adjacent portions of the image.

16. The apparatus of claim 15, where the image processor is configured for processing the first portion of the image such that a processed version of the first portion of the image is provided after a latency time of 20 to 40 ms after the image generator has provided the first portion of the image.

17. The apparatus of claim 1, where the image generator is synchronized to the image processor in such a way that when the first portion of the image is generated by the image generator said first portion is processed by the image processor without delay.

18. The apparatus of claim 17, where the image generator is further synchronized to the image processor in such a way that when the second portion of the image is provided by the image generator said second portion is processed by the image processor without delay.

19. The apparatus of claim 1, where the image generator is a CMOS image sensor.

20. The apparatus of claim 1, where the image processor comprising a LCD display for displaying the first and second portion of the image.

21. The apparatus of claim 20, where the image generator is configured for transferring the digital representation of the first and second portion of the image via an optical serial bus of the vehicle to the image processor.

22. The apparatus of claim 1, where the image generator is configured for transforming the first and second portion of the image in a digital representation thereof and for transferring the digital representation of the first and second portion of the image to the image processor.

23. The apparatus of claim 1, where the image generator is a rear view camera for providing a rear view of the vehicle.

24. An image processing system for processing an image of a vehicle surrounding, the image processing system comprising:
   an image generating means generating an image, the image having at least a first and a second portion, the first and the second portion being different from each other, the first portion of the image being generated earlier in time than the second portion; and
   an image processing means being configured for processing the first and the second portions of the image, where the image processing means is configures in such a way that the processing means process the first portion of the image while the image generating means is still generating the second portion of the image.

25. A method for processing an image of a surrounding of a vehicle, the method comprising the steps of:
   generating an image having at least a first and a second portion, the first and second portions being different from each other and the first portion of the image being provided earlier than the second portion of the image; and
   processing the first and second portions of the image in order to process the image, where an image processor is configured for processing said first portion of said image while said second portion of said image is not yet available to the image processor.

* * * * *

UNITED STATES PATENT AND TRADEMARK OFFICE
CERTIFICATE OF CORRECTION

| | | |
|---|---|---|
| PATENT NO. | : 8,160,297 B2 | |
| APPLICATION NO. | : 11/950350 | |
| DATED | : April 17, 2012 | |
| INVENTOR(S) | : Mohr et al. | |

Figure 1:
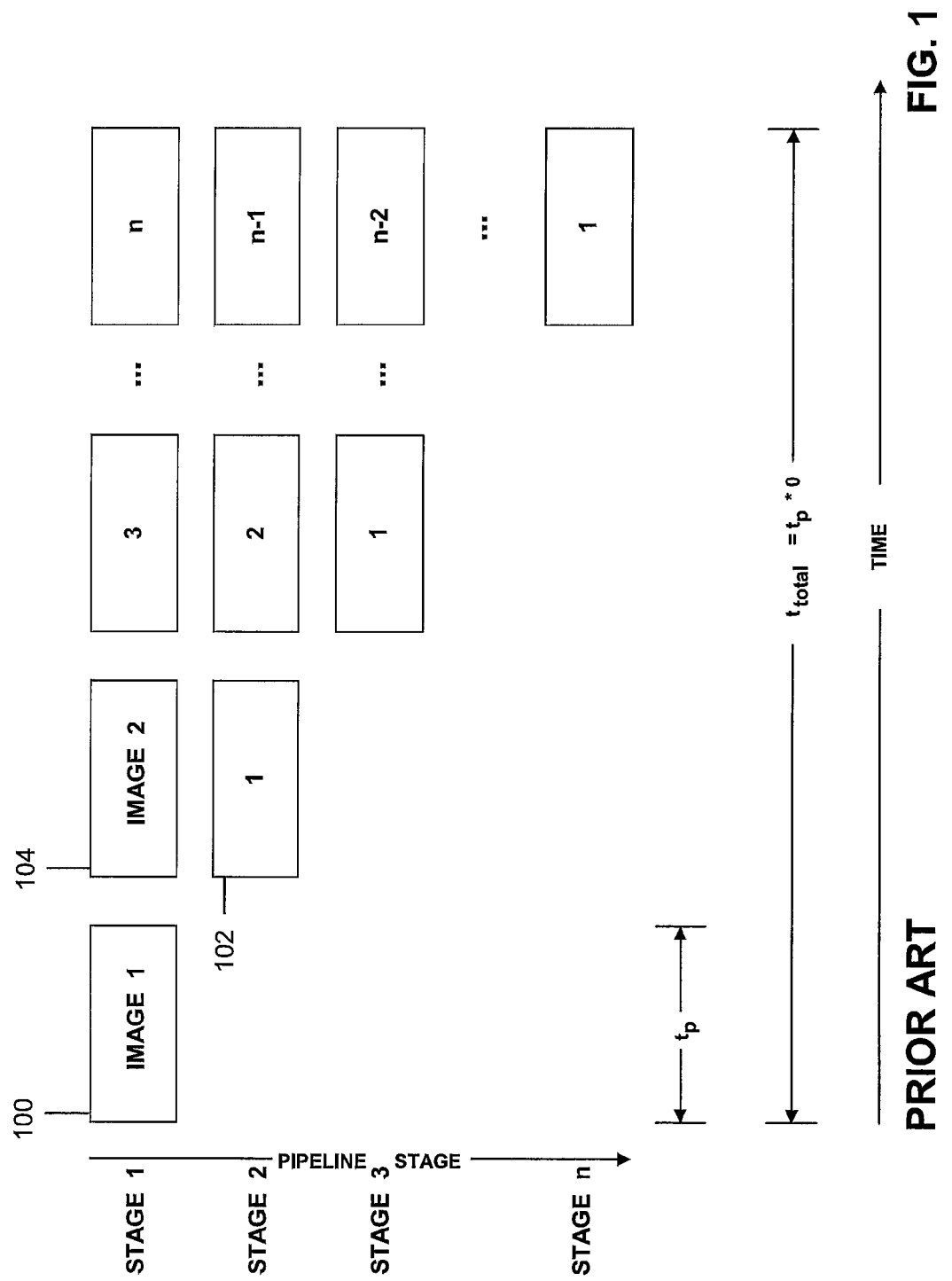
FIG. 1 is a schematic scheme illustrating a prior art conventional image processing approach for processing different images at different processing or generation stages.

It is certified that error appears in the above-identified patent and that said Letters Patent is hereby corrected as shown below:

In FIG. 1, the equation "...t.sub.total = t.sub.p * 0..." should be changed to -- t.sub.total = t.sub.p * n --

At column 1, line 63, "...position 202..." should be changed to -- position 102 --

At column 1, lines 63-64, "...position 204..." should be changed to -- position 104 --

At column 4, line 14, "...image generator 206..." should be changed to
-- image generator 204 (FIG. 2) --

At column 4, line 26, "...is send via..." should be changed to -- is sent via --

At column 5, lines 8-9, "...slices 500 and 402..." should be changed to -- slices 500 and 502 --

At column 6, line 17, "...it has to mentioned..." should be changed to -- it has to be mentioned --

At column 6, line 23, "...sup-images..." should be changed to -- sub-images --

At column 6, line 63, "...may probably has..." should be changed to -- may probably have --

Signed and Sealed this
Twenty-ninth Day of January, 2013

David J. Kappos
*Director of the United States Patent and Trademark Office*